INVENTORS:
ARTHUR H. LINTELMAN,
JAKE H. LEBUS AND
JAMES LEE NORMAN, JR.

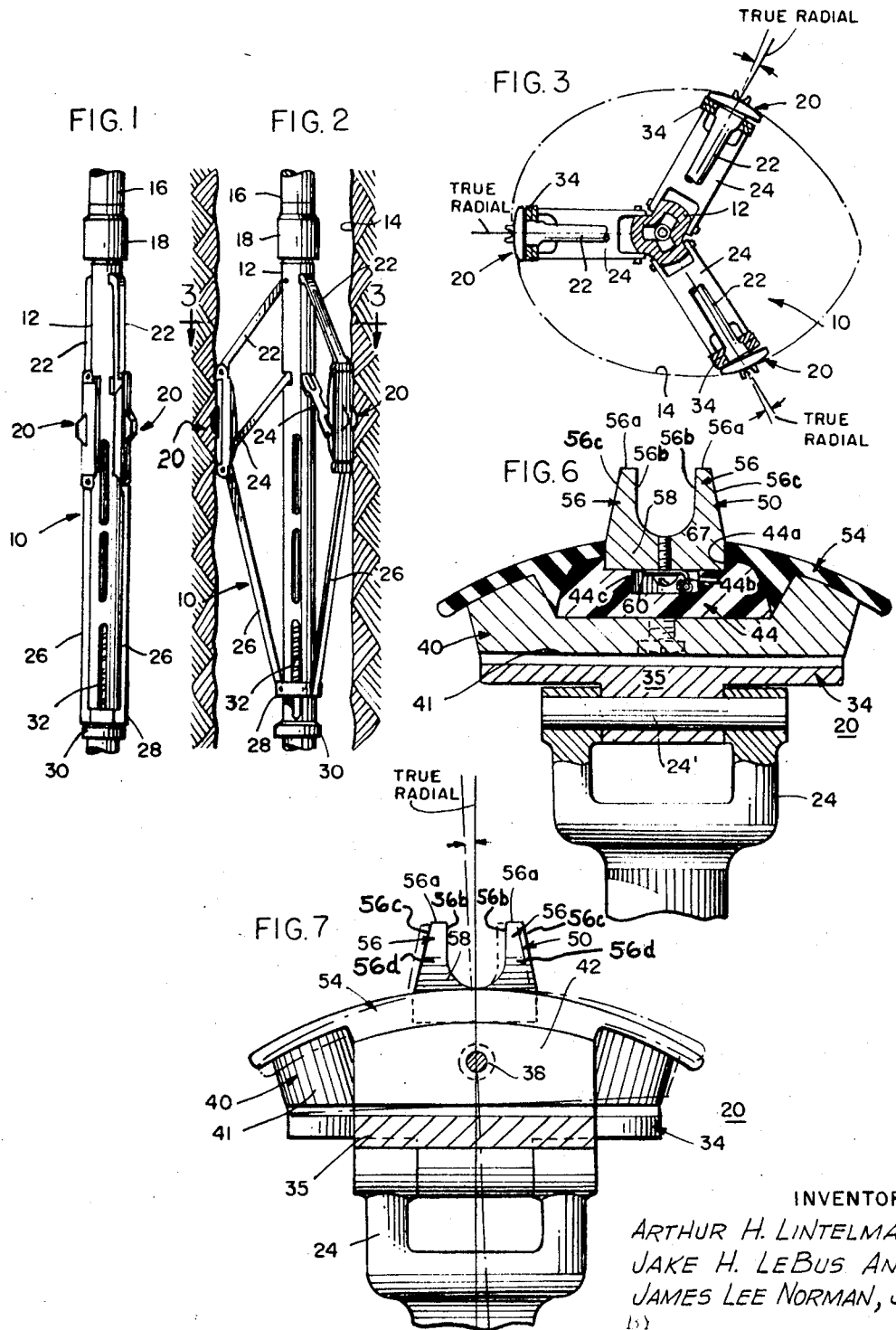

BY Mason, Kolehmainen, Rathburn & Wyss
ATT'YS.

United States Patent Office 3,454,870
Patented July 8, 1969

3,454,870
KNIFE STRUCTURE ELECTRODE, SUPPORT, AND SEALING MEANS FOR BOREHOLE LOGGING APPARATUS
Arthur H. Lintelman, Jake H. Le Bus, and James Lee Norman, Jr., Houston, Tex., assignors, by mesne assignments, to Dresser Industries, Inc., Dallas, Tex., a corporation of Delaware
Filed Jan. 6, 1967, Ser. No. 607,745
Int. Cl. G01v 3/02, 3/08
U.S. Cl. 324—10                                16 Claims

ABSTRACT OF THE DISCLOSURE

An electrode and support assembly for borehole logging apparatus comprising an elongated body and a current electrode movably supported from said body. Base means is provided for supporting the electrode in insulated removable relation thereon for engagement against the adjacent wall surface of the borehole. Support means is provided for supporting the base means and the electrode on the tool body for movement between a retracted position adjacent the body and an expanded position in which the electrode is in electrical contact with the adjacent lower surface of the borehole, said support means including a bracket for holding the base means and means mounting the base means for pivotal movement about a centrally disposed longitudinal axis generally parallel with the axis of the body for providing self-aligned seating of the electrode against the adjacent borehole or wall surface.

---

The present invention relates generally to contact-type, borehole logging apparatus, such as microsurvey logging apparatus, microfocus survey logging apparatus, microlateral logging survey apparatus, and contact-type logging instruments, generally, containing an electrode assembly comprising one or more electrodes imbedded in the face of a support member. Such arrangements require the maintenance of good electrical contact with the borehole wall for accuracy of the recorded measurements. Certain types of logging instruments usually have a pad of a flexible sealing material, such as neoprene, surrounding the electrode, and the pad is mounted on a supporting linkage system which forces the pad against the borehole wall to provide electrical contact between the electrode and borehole and effect sealing of the electrode from the borehole fluid. If the pad properly seals the borehole fluids from the electrodes, all signals from the electrode enter and return from the formation.

Most mechanical linkage systems are fixed so that the electrode assemblies or sealing pad arrangements have no freedom to allow the unit to properly seat at changing borehole diameters and shapes. Without this freedom, the arms of the mechanical linkage system must be perpendicular to the face of the formation irrespective of the shape of the hole in order for the unit to seat properly. It is frequently impossible for the linkage system to meet this condition due to irregular shape of the hole, cocking of the tool in the hole, chording of the hole by the arms because of high deviation angles, and high rotation of the tool during the logging operation. These conditions cause the unit to be mechanically raised or separated from the borehole wall, thus causing poor electrical contact or a loss of the tight seal around the electrode from the borehole fluids and results in poor and inaccurate logs.

Another problem encountered with contact-type logging apparatus, such as dipmeters, for determining the dip of the borehole strata, is that in the past it has been extremely difficult, if not impossible, to obtain resistivity or conductivity curves with the dipmeter which can be correlated when the well is drilled with a nonconductive medium. The measuring electrodes of the dipmeter tool are generally mounted on the face of a pad which is supported from the tool body and held against the surface of the borehole wall by a parallelogram-type linkage system. For the electrodes in a nonconductive medium to record accurately the changes in current to and from the borehole formation, it is essential that the electrodes actually contact the face of the formation itself. Nonconductive mud cakes or oil cakes often are present on the borehole walls and, when this occurs, many times the electrodes are unable to directly contact the strata formation because of the oil or mud cakes, resulting in inaccurate and erroneous information being obtained. Due to the extremely small electrical signals that are measured and the accuracy required of these signals, the contact area and contact resistance between the electrode and the strata formation must be maintained uniformly, and, accordingly, the electrodes must have a contact area that will maintain this contact uniformly. As the borehole formation is logged, wear on the electrode occurring during a considerable length of borehole logging sometimes causes significant changes in contact resistance, resulting again in inaccurate and erroneous survey information.

Accordingly, it is an object of the present invention to provide a new and improved contact-type, borehole logging apparatus which eliminates or greatly diminishes one or more of the aforementioned problems and thereby provides much more accurate and useful well logging information.

Another object of the present invention is the provision of a contact-type, borehole logging instrument including new and improved means for insuring good electrical contact between the electrodes and the borehole wall.

Another object of the present invention is the provision of a new and improved contact-type logging instrument with means for insuring tight sealing around the electrodes to prevent undesired electrical signals from interfering with the logging signals.

Yet another object of the present invention is the provision of a contact-type, borehole logging apparatus including new and improved electrode pad assemblies which are self-aligning with respect to the adjacent borehole wall surface thereby insuring better electrical contact between the electrodes and borehole strata even though the borehole is irregular in shape.

Yet another object of the present invention is the provision of a new and improved contact-type, borehole logging apparatus for use with conductive borehole fluids, including new and improved means for insuring that the current flowing through the electrodes enters the borehole formation only and does not leak or pass into the conductive well fluid.

Still another object of the present invention is the provision of a new and improved contact-type borehole logging apparatus for use with nonconductive well fluids including new and improved electrode means for penetrating through nonconductive material on the borehole wall surface, thereby insuring uniform, low resistance, electrical contact between the electrode means and the borehole strata.

Still another object of the present invention is the provision of a new and improved electrode for contact-type borehole logging apparatus which may be easily replaced, should it become worn excessively or damaged during usage.

Yet another object of the present invention is the provision of a new and improved dipmeter construction employing a new and improved current electrode which insures good, uniform, low resistance, electrical contact with the borehole strata.

Still another object of the present invention is the provision of a new and improved current electrode for use with dipmeters, and the like, in nonconductive well fluids, which electrode is specially shaped to provide a constantly uniform area of surface contact between the electrode and borehole strata during movement of the instrument to different levels in the borehole as the well survey proceeds.

Yet another object of the invention is the provision of a new and improved current electrode of the type described which is adapted to actually wedge into, penetrate, and cut through nonconductive material on the borehole wall surface, such as oil or mud cakes, to establish uniform, low resistance, electrical contact with the adjacent borehole strata.

Still another object of the invention is the provision of a new and improved current electrode of the character described having a plurality of knife members thereon adapted to penetrate through nonconductive layers into adjacent strata as the instrument is moving through the borehole.

A still further object of the present invention is the provision of a new and improved current electrode of the type described having one or more wedge-shaped knife members arranged so that abrasive wear on the electrode is minimal and does not materially affect the contact area or contact resistance between the electrode and borehole wall strata during a lengthy borehole survey.

A further object of the invention is the provision of a new and improved current electrode of the character described having a pair of spaced-apart, wedge-shaped knife members which facilitate penetration of the electrode through oil or mud cakes, and the like, into the borehole strata and better distribute the forces applied for penetrating into the strata, resulting in longer electrode life and a more uniform contact area between the electrode and the borehole strata during a well survey.

While the present invention is useful in connection with many different kinds of contact-type well logging apparatus, microfocus survey logging apparatus, microlateral logging apparatus, and diameters, for ease in illustration and description of the invention, a dipmeter construction is herein shown and described by way of illustration and not limitation, and it is to be understood that the present invention is not limited in its application to dipmeter-type contact logging instruments alone.

For a better understanding of the invention, reference should be had to the following detailed description, taken in conjunction with the drawings, in which:

FIG. 1 is a side elevational view of one embodiment of a new and improved dipmeter constructed in accordance with the present invention and illustrated with the pads in a closed condition for running into and out of the borehole;

FIG. 2 is a side elevational view of the dipmeter of FIG. 1 with the pads in an open condition against the walls of a borehole;

FIG. 3 is a transverse cross-sectional view taken substantially along line 3—3 of FIG. 2 illustrating the pads seated against the walls of an irregularly shaped borehole;

FIG. 6 is a transverse sectional view of the pad construction of FIG. 4 taken substantially along line 6—6 thereof; and FIG. 7 is a transverse sectional view taken substantially along the line 7—7 of FIG. 4.

Figure 4:
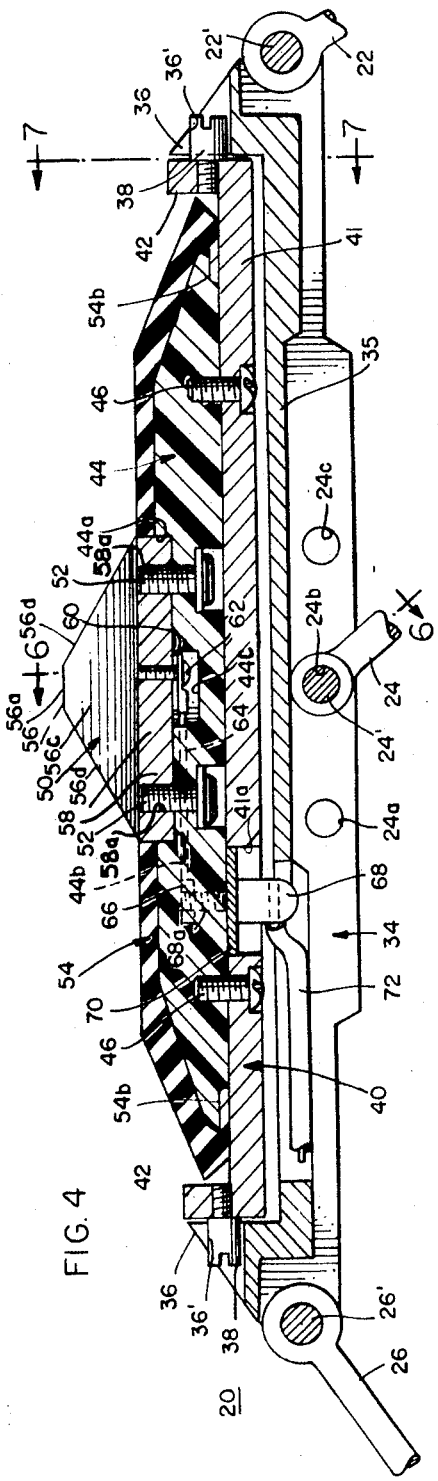
FIG. 4 is an enlarged longitudinal sectional view of the new and improved dipmeter pad construction of the present invention.
Figure 5:
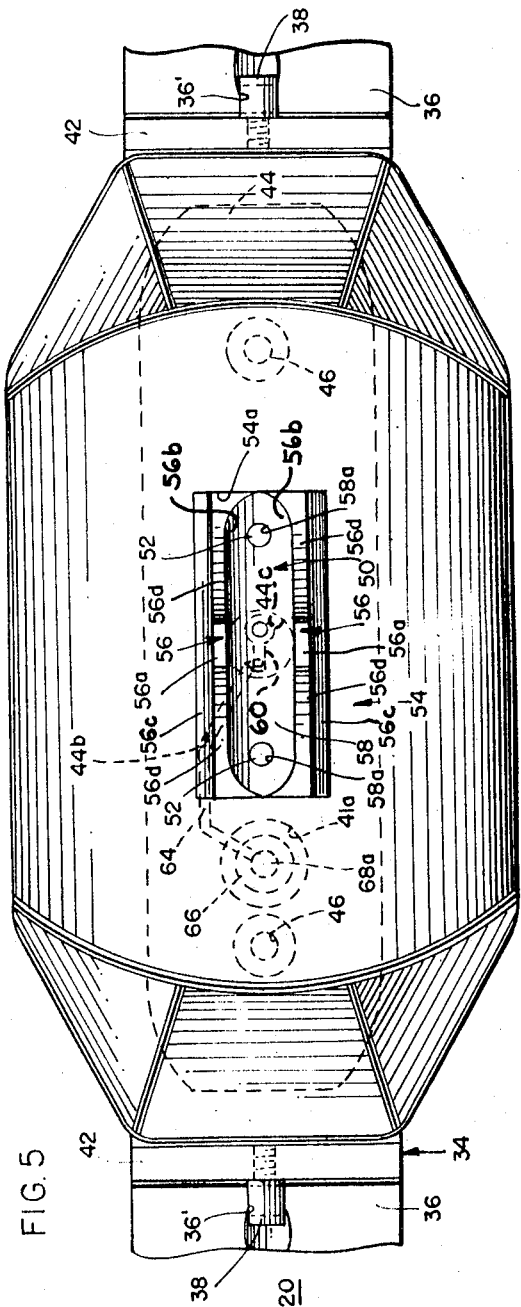
FIG. 5 is a side elevational view of the pad construction of FIG. 4 showing the sealing face of the pad.

The foregoing and other objects and advantages of the present invention are accomplished in one embodiment thereof by the provision of a new and improved contact-type well logging apparatus comprising an elongated body and an electrode movable outwardly of said body into electrical contact with the adjacent wall surface of the borehole. Base means are provided for supporting the electrode for engagement with the adjacent wall surface of the borehole when the electrode is moved outwardly into contact therewith. Support means are provided for supporting the base means for movement between a retracted position adjacent the body and an expanded position away from the body in which the electrode and base means are forced into contact with the adjacent wall surface of the borehole. The support means include a bracket for supporting the base means, and means are provided for mounting the base means for pivotal movement about a longitudinal axis generally parallel to the borehole whereby the electrode and base means are permitted to pivot in self-aligning sealing engagement with the adjacent wall surface of the borehole.

Another aspect of the invention is a new and improved electrode especially adapted for use in contact-type, well logging apparatus used in wells with nonconductive fluid. The electrode is mounted on a base member having an outer surface adapted to oppose the adjacent borehole wall surface when the apparatus is expanded, and the electrode includes a wedge-shaped knife structure extending outwardly of the outer face of the base member to cut through any nonconductive material on the borehole wall surface and thereby establish good electrical contact with the strata of the borehole. Because the knife structure of the electrode actually penetrates through the nonconductive mud or oil cakes commonly encountered in boreholes, a low resistance contact is established between the electrode and the borehole strata, and the area of electrical contact is substantially uniform throughout a continuous well logging operation.

Referring now, more particularly, to the drawings, therein is illustrated a new and improved contact-type borehole logging apparatus constructed in accordance with the present invention and indicated generally by the reference numeral 10. The apparatus 10 comprises a dipmeter which is adapted to determine the dip of the strata in a borehole by measuring the resistivity from three equilaterally spaced electrodes at various levels in the borehole, and includes an elongated tubular body 12 which is lowered into a borehole 14 and moved along the axis thereof. The body 12 is supported on a cable and, as illustrated, is coupled to a tubular housing 16 containing instruments and electrical components by means of a tubular coupling 18. Electrical cables for controlling and supplying current to the dipmeter and other instruments connected therewith pass into the tubular body 12 of the dipmeter from the coupling 18 and tube 16, and other instruments and equipment may be connected onto the lower end of the body 12, if required.

The dipmeter includes three separate electrode assemblies 20 having their longitudinal axes generally parallel to the longitudinal axis of the body 12 and spaced in equilateral arrangement with respect thereto. Each electrode assembly 20 is supported on the body 12 by means of a pair of parallelogram forming, support arms 22 and 24 having their inner ends pivotally mounted on the body 12 about axes transverse thereto. The outer ends of the arms are pivotally connected to the electrode assemblies about axes parallel with those at the inner ends of the support arms and the electrode assemblies are movable radially outward of the body 12 from a retracted position (FIG. 1) to an expanded position (FIGS. 2 and 3) wherein the electrodes are pressed into contact with the adjacent wall surfaces of the borehole 14.

While the dipmeter 10 preferably includes three electrode assemblies equilaterally spaced around the body of the instrument in order to obtain accurate information on the dip of the strata, other types of contact-type, borehole logging instruments may only require one such electrode assembly, which is forced outwardly from the body of the instrument into contact with the borehole strata, and it is to be understood that the present invention applies equally well to instruments of this type.

When using the dipmeter, the electrode assemblies are generally in the retracted position as the instrument is lowered into the borehole and are moved to the expanded position when in the borehole by an electrical signal received from control equipment at the surface. After the dipmeter is expanded, it is moved upwardly or downwardly through various levels in the borehole and continuous readings are taken of the current flowing between the electrodes and the adjacent borehole strata at the various levels traversed by the dipmeter.

For a more complete description of the operation and control of the dipmeter, reference should be had to the aforementioned United States Patent No. 3,068,400 which explains in detail the instrumentation and readings that are taken. Briefly, however, the dipmeter generally includes associated electronic and other equipment which measures and continuously records the current flow through the electrodes on the several electrode pad assemblies into the borehole strata and also includes equipment and instrumentation for recording these currents simultaneously with respect to the depth of the instrument in the borehole. The alignment of the respective electrode pad assemblies with respect to true or magnetic North, the diameter of the borehole, and the inclination of the longitudinal axis of the dipmeter body 12 with respect to the vertical are also recorded at the same time, and all of this information is then correlated to provide useful curves, graphs, and logs from which the actual dip of the borehole strata at different levels may be accurately ascertained.

As the dipmeter traverses the borehole and obstructions or sharp bends are encountered, the electrode assemblies 20 can be retracted to the position shown in FIG. 1 by an electrical signal from the surface, and in this manner binding of the dipmeter in the borehole and the resulting damage thereto can be avoided. Generally, in relatively smooth and straight boreholes, once the dipmeter and associated equipment is lowered into the borehole and the electrode assemblies are moved to the expanded position, the instrument preferably is retained in the expanded condition until the desired survey of the borehole is obtained and the readings are continuously obtained without interruption.

In order to move the electrode assemblies 20 from the retracted position (FIG. 1) to the expanded position (FIGS. 2 and 3), a plurality of thrust arms 26 are pivotally connected to the lower ends of the respective electrode assemblies, and the lower ends of the thrust arms are in turn pivotally connected to a common annular collar 28 mounted for sliding movement on the body 12 (FIGS. 1 and 2). When the collar 28 is moved downwardly on the body to a lower stop position against an adjustable stop collar 30 adjacent the lower end of the body, the electrode assemblies are moved to the retracted position. In order to move the electrode assemblies radially outward to the expanded position against the borehole wall surface, the collar 28 is moved upwardly on the body and the thrust arms 26 force the electrode assemblies outwardly. During outward movement of the electrode assemblies, the support arms 22 and 24 maintain the longitudinal axes of the respective electrode assemblies in continuous parallel relation with the axis of the dipmeter body 12, and because all of the thrust arms 28 are connected to a single, common collar, the assemblies all move simultaneously and in equal amounts outwardly of the body until they encounter the borehole wall surface. Accordingly, the axis of the body 12 is generally well centered with respect to the longitudinal, central axis of the bore hole whenever the assemblies are expanded.

Movement of the collar 28 on the body to retract and expand the electrode assemblies is accomplished by motive power means, such as an electrical motor or hydraulic system carried on the body, and suitable slots are provided in the body to permit connection between the collar and the source of motive power which is preferably enclosed within the tubular body 12. Preferably, a high strength spring assembly 32 or other resilient coupling means is provided between the source of motive power and the movable collar 28 to absorb the shock encountered when the electrode assemblies first engage the adjacent borehole wall surfaces during expansion. The spring assembly and motive power unit are preferably adjustable to provide for the desired pressure or forces required to force the electrode assemblies against the borehole wall and achieve the proper sealing and electrode contact.

In accordance with the present invention, each of the electrode assemblies 20 (illustrated in enlarged detail in FIGS. 4 through 7) is mounted on a supporting bracket 34 which is connected to the outer ends of the respective support arms 22 and 24 and the thrust arms 26 by means of a plurality of pivot pins 22', 24', and 26', which extend transversely of the longitudinal axes of the electrode assemblies. Pivot pins 22' and 26' are journaled adjacent the upper and lower ends, respectively, of the support bracket while the pivot pin 24' is seated within one of several transverse apertures 24a, 24b, and 24c positioned intermediate the upper and lower ends of the bracket. When pairs of support arms 22 and 24 of shorter or longer dimensions are used, the apertures 24a or 24c may be used instead of the apertures 24b to achieve the desired amount of outward travel of the electrode assemblies to the expanded position.

The bracket 34 includes a main body portion 35 having a flat outer surface and a pair of intergrally formed, outwardly extending flanges 36 at opposite ends thereof. Each of the flanges 36 is formed with an aperture 36' aligned along a common axis longitudinal of the body in order to receive the outer end of a pivot pin 38 for supporting one end of an electrode backing member 40. The backing member 40 includes a flat main body portion 41 having a pair of outwardly extending, integrally formed flanges 42 at opposite ends thereof. Each of the flanges 42 is provided with a threaded aperture aligned with an aperture 36' in the adjacent flange 36 to accommodate the threaded inner end of a supporting pin 38. The pins 38 are removable by unthreading them from the backing member and thus the backing members are easily disassembled from their supporting brackets. Preferably, the backing member 40 and support bracket 34 are formed of strong, corrosion-resistant material, such as stainless steel, in order to withstand the extreme conditions of heat, cold, pressure, and corrosion which are sometimes encountered within boreholes.

The main body portion 41 of the backing member and the body portion 35 of the supporting bracket 24 are spaced apart and, accordingly, as shown in FIG. 7, pivotal movement of the backing member about the pins 38 is limited to a few degrees either way from the true radial because of engagement of the longitudinal corners on the back side of the backing member body against the outer face of the bracket body.

The backing member body 41 provides support for a base member 44 constructed of rigid insulating material, and the base member is removably secured to the body 41 by a pair of cap screws 46 which are threaded into the base member from the back side of the backing member. The heads of the screws are seated within appropriate recesses provided on the back side of the body portion 41 to prevent interference during pivotal movement of the backing member on the support bracket 34. The insulating base member 44 supports a current electrode 50 which is centrally mounted on its outer face and is adapted to contact the borehole wall when the instrument is expanded, as shown in FIGS. 2 and 3. Preferably, the electrode is secured to the base member by means of a pair of removable cap screws 52 extending forwardly through the base member into the electrode and having their heads seated within suitable recesses provided on the back side of the base member. To insure against and positively prevent movement of the electrode on the base member 44, a recess 44a is formed in the outer face of the base member to seat the base of the electrode. Thus, the electrode 50 can be dismounted from the base member and replaced by removing the screws 52 and disconnecting the electrical leads for supplying current to the electrode, as will be described hereinafter in greater detail. Preferably, the outer face of the base member 44 is curved to match generally the curve of the adjacent borehole wall into which the apparatus is lowered, and because of the pivotal mounting arrangement of the backing member 40 on the bracket 34, the backing member and parts mounted thereon are self-aligning with the adjacent surface of the borehole wall to thereby insure better electrical contact between the electrodes and the borehole strata, as will be described hereinafter in greater detail.

The electrode 50 is especially adapted for dipmeters and the like which are used in boreholes with nonconductive well fluid and it is to be understood that various other types of electrodes could be used in connection with the pivotally mounted backing structure of the present invention because of the good electrical contact and improved sealing against the borehole wall surface provided thereby. For example, prior types of electrodes having a relative flat outer contact face (i.e., having no strata penetrating structure) could be used in logging apparatus operating on the focused current principle wherein one or more main current electrodes and associated guard electrodes may be provided on each electrode assembly, as will be readily understood by those skilled in the art.

In applications wherein conductive well fluids are present and is necessary to tightly seal around the electrodes between the outer face of the base member 44 and the adjacent bore hole wall surface to prevent leakage current from flowing directly to the well fluid rather than into the borehole strata formation, each electrode assembly includes a resilient sealing pad 54 which covers the outer face of the base member 44 around the electrode or electrodes mounted thereon. The resilient sealing pad 54 is generally formed of rubber or plastic material and includes one or more slots 54a to permit the electrodes to establish contact with the borehole wall surface directly. When the electrode assemblies 20 are forced outwardly against the borehole wall surface, the resilient sealing pads 54 are compressed and tightly sealed around the electrode and thereby prevent stray leakage currents from flowing directly around the pad into the well fluid within the borehole. In this manner, it is positively insured that the current from the electrodes will pass directly into the borehole wall strata from the electrode and not into the surrounding well fluid in the borehole. The sealing pads are retained on the respective base members 44 by means of a peripheral lip 54b on the back side (FIG. 4) extending inwardly from the outer peripheral edge, and the lip is clamped tightly between the base member and backing member body 41 when the screws 46 are tightened. If desired, a torn or damaged sealing pad may be easily replaced by removing the base member 44 from the backing plate 40 after the screws 46 are loosened.

As illustrated in FIGS. 3 and 7, each backing member 40 and the electrodes and components mounted thereon have limited pivotal movement with respect to the true radials extending from the borehole axis as shown, and accordingly, as the electrode assemblies 20 are expanded outwardly against the borehole wall surface, each backing member 40 can pivot about the pins 38 to best align itself with the mean tangent of the adjacent borehole wall surface. The self-aligning feature provides a distinct advantage over those previous instruments in which the outer surface of the assemblies is fixed to be normal or perpendicular to a radial extending outwardly from the axis of the body and borehole. As shown in FIG. 3, should the borehole 14 be slightly egg-shaped rather than a true circle, each of the electrode assemblies 20 will align itself to provide for excellent electrical contact between the electrodes and the borehole wall surface and effective sealing against the adjacent borehole wall surface around the electrodes when required. Because the pivotal movement of the electrode assemblies about their respective longitudinal axes is limited to a few degrees either side of the true radial, only slight errors in azimuth will occur, and these are outweighted by the improved electrical contact and sealing obtained. As the logging apparatus is moved along the borehole axis during a survey, with the electrode assemblies expanded, each assembly can pivot about its longitudinal axis to achieve the best contacting and sealing position as irregularities in the borehole occur. The pivotal backing member mounting arrangement of the present invention is extremely useful with contact-type, borehole logging instruments used in boreholes with conductive well fluid where tight sealing around the electrodes is essential to good survey results.

The current electrode 50 is of a unique construction and is adapted for use with dipmeters and other survey apparatus, especially in boreholes where nonconductive well fluid is present and nonconductive mud or oil cakes are found on the borehole wall surface. Preferably, the electrodes are used with a pivotal backing member, as previously described, with improved results, but the electrodes may be used on fixed backing member structures also. The electrode 50 is adapted to penetrate into the borehole strata rather than merely press against the surface and, accordingly, better contact (i.e., lower, more uniform contact resistance) with the borehole wall for the flow of electrical current is achieved. The electrode includes at least one and preferably a pair of parallel, spaced-apart, wedge-shaped knife members 56 adapted to cut through the borehole mud or oil cakes. When a pair of knife members are used, they are integrally joined with a common web structure or base 58 which is seated in the recess 44a in the base member. The cap screws 52 are threadedly received in suitable apertures 58a formed in the web structure and electrical connection to the electrode is provided by means of a lug 60 and small screw 62 which is threaded into another aperture formed in the back side of the electrode web structure or base. The lug 60 is connected to one end of a flexible lead wire 64 which extends through a slotted-out portion 44b formed in the insulating base member 44 and the other end of the lead wire is connected by means of a washer 66 molded into the base member to a removable terminal screw 68 having a threaded end 68a which is threadedly connected with the washer 66. The terminal screw 68 is seated in a circular opening 41a formed in the main body of the backing member 40, and an insulating washer 70 is provided to insulate the terminal 68 from the body portion 41 of the backing member.

In order to accommodate the terminal lug 60 and the lead wire 64, the base member 44 is provided with a large recess 44c which is in communication with the electrode seating recess 44a and the slot 44b which communicates with the embedded washer 66. Once the electrode 50 has been removed from the base member 44, the lug 60 and the base or web of the electrode may be disconnected by removing the small cap screw 62. Current for the electrode 50 is supplied through the terminal 68 on the back side of the base member 44 by a flexible lead wire 72 which extends along one of the support arms 22 or 24 and into the interior of the tubular body 12.

When it is desired to remove or replace either a resilient sealing pad 54 or a current focusing electrode 50, the base member 54 is first removed from the supporting backing member 40 by removal of the cap screws 46. Once this is accomplished, the electrode 50 can be removed from the base member by removing the cap screws 52 and disconnecting the small terminal screw 62. The electrode 50 can then be replaced and secured in place and a new sealing pad 54 fitted onto the base member. The base member and the new pad and electrode are then secured to the backing member 40 by tightening the screws 46. In this manner, replacement of the electrode and sealing pad 54 is easily effected, should either of these components become damaged or mutilated.

Referring now, more specifically, to the unique design of current electrodes 50, each of the knife members 56 includes a small, outer end, contact surface 56a designed to penetrate through nonconductive mud or oil cakes and directly contact the adjacent borehole strata with a minimum of contact resistance. As viewed in FIGS. 6 and 7, the small, outer end, contact surfaces 56a are intersected by inside and outside longitudinal edge surfaces 56b and 56c, respectively. Each pair of longitudinal side surfaces 56b and 56c are tapered to diverge from one another thereby forming a wedge-shaped knife cross section which is thicker adjacent the base 58 of the electrode structure than it is at the tip or contact surface 56a. Viewing the electrode longitudinally, as shown in FIG. 4, each knife member 56 also includes gradually tapering transverse end surfaces 56d which intersect sharply with the longitudinal side surfaces 56b and 56c and with the small, outer end, contact surfaces 56a. Because of the sharpness of the intersecting edges between the surfaces 56a, 56b, 56c, and 56d, the electrode structure 50 is adapted to continuously slice or cut through the nonconductive oil or mud cakes on the borehole wall during a survey as the tool is moved along the borehole with a minimum of wear occurring on the outer contact surfaces 56a.

Preferably, the intersection of the inner, longitudinal side surfaces 56c are parallel adjacent their outer portions and are curved along their inner portions to smoothly join the outer surface of web structure 58. This strengthens the knife members laterally and helps prevent them from shearing or breaking off should lateral strain be applied. Also, the smoothly rounded U-shaped surface formed by the inside longitudinal sides 56c and the web 58 permits easier sliding of the electrode in the borehole as the dipmeter is moved from level to level.

Because the total area of the electrode contact surfaces 56c is relatively small, the contact pressure exerted by the surfaces normal to the borehole surface is extremely high (generally exceeding 4000 p.s.i.) and, accordingly, low contact resistance is obtained. Moreover, should these surfaces become worn by abrasion, their area will increase only slightly because of the tapered side surfaces of the electrode knives, and this increase in area will compensate for the reduced contact pressure; consequently, the contact resistance will remain approximately the same. The dual wedge-shaped knife blade structures 56 of the electrodes 50, in combination with the self-aligning feature of the electrode assemblies 20, assure good wall following and minimize key-seating resulting in more accurate information being obtained by the dipmeter.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a contact-type logging apparatus adapted to move along a borehole, means comprising an elongated body and a current electrode movably mounted on said body, base means supporting said electrode in insulated, removable relation thereon for engagement with the adjacent wall surface of said borehole, said base means including a rigid backing member having an elongated body portion parallel of said body of said apparatus and upper and lower end flanges extending outwardly thereof, a rigid insulating member removably secured to an outwardly facing surface of said body portion between said end flanges, replaceable resilient sealing pad means mounted on an insulating member and extending around said electrode for sealing engagement against the wall of said borehole, said sealing pad means including lip portions at opposite ends secured between end portions of said insulating member and adjacent portions of said outwardly facing surface for holding said pad means securely in place, and support means for supporting said base means and electrode on said body for movement between a retracted position adjacent said body and an expanded position in which said electrode is in electrical contact with the adjacent wall surface of said borehole, said support means including a bracket for holding said base means and including means mounting said base means for pivotal movement about a centrally disposed longitudinal axis generally parallel with the longitudinal axis of said body for permitting self-aligning seating of said electrode with said adjacent borehole wall surface upon engagement therewith in said expanded position.

2. The apparatus of claim 1 wherein said support means includes at least one support arm connected to said body of said apparatus for pivotal movement about a first axis transverse thereof, a support bracket connected to the outer end of said arm for pivotal movement about a second axis parallel to said first axis, said base means being pivotally mounted on said bracket, said bracket including a pair of end flanges extending outwardly of said body, and means for pivotally interconnecting adjacent pairs of end flanges of said backing member and bracket.

3. The apparatus of claim 1 wherein said insulating member includes recess means defined on an outwardly facing side thereof for receiving said electrode and removable fastening means extended through said insulating member into said recess means for securing said electrode in place.

4. The apparatus of claim 2 including means for limiting the pivotal movement of said base means about said longitudinal axis with respect to said bracket.

5. The apparatus of claim 2 wherein said elongated body portion of said backing member is formed with an opening in communication with said insulating member and an inwardly facing surface of said backing member, and removable terminal means mounted in said opening and projecting into said insulating member interconnected with said electrode in said recess means.

6. In a contact-type logging apparatus adapted to move along a borehole, means comprising an elongated body and a plurality of electrodes movably mounted on said body and equilaterally spaced with respect to the longitudinal axis thereof, base means for supporting each of said electrodes for engagement with the wall surface of said borehole, said base means including a rigid backing member having an elongated body portion parallel of said body of said apparatus and upper and lower end flanges extending outwardly thereof, a rigid insulating member removably secured to an outwardly facing surface of said body portion between said end flanges, replaceable resilient sealing pad means mounted on an insulating member and extending around said electrode for sealing engagement against the wall of said borehole, said sealing pad means including lip portions at opposite ends secured between end portions of said insulating member and adjacent portions of said outwardly facing surface for holding said pad means securely in place, and support means for supporting said base means from said body for movement between a retracted position adjacent said body and an expanded position in which said electrodes are in contact with the adjacent borehole wall surface, said support means including bracket means for supporting said base means and including means mounting each of said base means for pivotal movement about a centrally disposed, longitudinal axis generally parallel to the longitudinal axis of said body for permitting self-aligning seating of said electrodes with the adjacent borehole wall surface upon movement to said expanded position.

7. The apparatus of claim 6 wherein said electrode includes knife structure extending outwardly of said sealing pad means for penetrating into the borehole wall strata upon movement into said expanded position.

8. In a contact-type logging instrument having an electrode assembly support means and adapted to move along a borehole, the improvement comprising an electrode assembly including base means pivotally mounted on said support means for pivotal movement about a longitudinal axis parallel to the borehole, said base means comprising sealing pad means having an outer face adapted to engage the adjacent surface of said borehole and a rear face, a rigid backing member and an insulating member mounted thereon attached to the rear face of said sealing pad means, a current electrode removably secured on said insulating member and including a knife structure extending outwardly from said outer face and through said sealing pad means for penetrating into the borehole wall strata, said knife structure including a contact surface at the outer end for making electrical contact with said borehole strata when said base means is moved toward engagement with the adjacent borehole wall surface.

9. The apparatus of claim 8 wherein said knife structure includes at least one wedge-shaped knife member having side surfaces tapered toward one another outwardly of said sealing pad means and sharply intersecting said contact surface at the outer end of said electrode.

10. The apparatus of claim 9 wherein said electrode knife structure includes a pair of said spaced apart, wedge-shaped knife members and a pair of contact surfaces at the outer ends thereof.

11. The apparatus of claim 9 wherein said wedge-shaped knife member includes two pairs of tapered side surfaces transverse to one another and said outer contact surface.

12. The apparatus of claim 9 wherein said knife member extends longitudinally parallel with the axis of said body.

13. The apparatus of claim 10 wherein said spaced apart knife members are integrally joined with a web structure removably secured to said base means, said insulating member including a recess on its outer face for receiving said web structure, and removable fastening means extending through said insulating member into said web structure for holding said electrode in place.

14. The apparatus of claim 13 wherein said outer end contact surfaces of said knife members are substantially smaller in area than the surface of said web structure adjacent said base means.

15. The apparatus construction of claim 13 wherein said spaced apart knife members include inner longitudinal side surfaces facing one another and curved along their portions adjacent said web structure to smoothly join therewith.

16. The apparatus construction of claim 15 wherein said inner longitudinal side surfaces are parallel with each other, adjacent outer portions thereof.

References Cited

UNITED STATES PATENTS

| | | | |
|---|---|---|---|
| 2,400,678 | 5/1946 | Archie | 324—10 XR |
| 2,588,717 | 3/1952 | Goodwin. | |
| 2,632,795 | 3/1953 | Boucher | 324—10 XR |
| 2,747,402 | 5/1956 | Doll | 324—10 XR |
| 2,873,423 | 2/1959 | Graham et al. | 324—10 XR |
| 3,120,122 | 2/1964 | Kokesh. | |
| 3,132,298 | 5/1964 | Doll et al. | 324—10 |
| 3,267,366 | 8/1966 | Bricaud | 324—34 |
| 3,379,963 | 4/1968 | Saurenman | 324—10 |
| 3,379,964 | 4/1968 | Segesman | 324—10 |
| 3,379,965 | 4/1968 | Tanguy et al. | 324—10 |

RUDOLPH V. ROLINEC, *Primary Examiner.*

G. R. STRECKER, *Assistant Examiner.*